United States Patent [19]

Nakamura

[11] Patent Number: 5,726,849
[45] Date of Patent: Mar. 10, 1998

[54] INPUT OVERCURRENT SUPPRESSION CIRCUIT

[75] Inventor: Mitsuo Nakamura, Kawasaki, Japan

[73] Assignee: Fujitsu Limited, Kawasaki, Japan

[21] Appl. No.: 739,216

[22] Filed: Oct. 29, 1996

Related U.S. Application Data

[63] Continuation of Ser. No. 578,786, Dec. 26, 1995, abandoned, which is a continuation of Ser. No. 202,559, Feb. 28, 1994, abandoned.

[30] Foreign Application Priority Data

Apr. 19, 1993 [JP] Japan ................. 5-091233

[51] Int. Cl.$^6$ ................................. G05F 1/573
[52] U.S. Cl. ........................... 361/93; 361/94
[58] Field of Search ................. 361/93, 94, 18, 361/58, 57; 363/15; 323/278; 455/217

[56] References Cited

U.S. PATENT DOCUMENTS

| | | | |
|---|---|---|---|
| 4,870,534 | 9/1989 | Harford | 361/58 |
| 5,010,293 | 4/1991 | Ellersick | 323/278 |
| 5,170,311 | 12/1992 | Zulaski et al. | 361/94 |
| 5,180,964 | 1/1993 | Ewing | 323/222 |
| 5,181,155 | 1/1993 | Beg et al. | 361/94 |
| 5,331,532 | 7/1994 | Iwai et al. | 363/20 |
| 5,388,022 | 2/1995 | Ahuja | 361/94 |
| 5,440,441 | 8/1995 | Ahuja | 361/62 |
| 5,561,596 | 10/1996 | Hemena et al. | 363/50 |

*Primary Examiner*—Jeffrey A. Gaffin
*Assistant Examiner*—Peguy JeanPierre
*Attorney, Agent, or Firm*—Staas & Halsey

[57] ABSTRACT

An input overcurent suppression circuit is used for a DC-DC converter in uninterruptible power supply source and includes a plurality of DC-DC converters, an AC-DC converter and a detecting means for detecting an input current to the DC-DC converters.

In the plural DC-DC converters, a parallel circuit constituted by a resistor element and a switching element is connected in series with an input circuit to break the circuit in response to an overcurrent or over heating. When the power source circuit is closed, a surge current-preventing circuit prevents the surge current by turning a switching element off for a predetermined period of time.

The AC-DC converter feeds current to at least two or more DC-DC converters among the plurality of DC-DC converters.

When the detecting means has detected an overcurrent, the switching element is turned off to turn off the resistor element connected in parallel with the switching element, to thereby suppress the overcurrent flowing into the AC-DC converter.

22 Claims, 9 Drawing Sheets

5,726,849

INPUT OVERCURRENT SUPPRESSION CIRCUIT

This application is a continuation of application Ser. No. 08/578,786 filed on Dec. 26, 1995, now abandoned, which is a continuation of application Ser. No. 08/202,559 filed on Feb. 28, 1995, now abandoned.

BACKGROUND OF THE INVENTION

1. Filed of the Invention

The present invention relates to an input overcurrent suppression circuit that can be favorably adapted to DC-to-DC (abbreviated DC-DC) converters in an uninterruptible power supply.

2. Description of the Related Art

Recently, various types of non-stop or uninterruptible power supplies have been developed.

In general, a DC-DC converter is used to prevent current surge when a power supply is switched ON.

Nevertheless, if a capacitor or a main transistor or the like is short-circuited in a prior art DC-DC converter, higher current flows through a field effect transistor. Therefore, a line voltage is reduced or high current flows in a power distribution unit (PDU) to turn off the output and stop a supply of electric power to a load, and a circuit connected to the DC-DC converter is often stopped.

As a result, in the prior art, even if a DC-DC converter is duplexed, a power distribution unit often is stopped due to a short-circuit of internal elements in the DC-DC converter and the stoppage of the power supply to the load reduces the reliability of the power source.

SUMMARY OF THE INVENTION

In light of the above drawbacks, the present invention was devised.

It is an object of the present invention to provide an input overcurrent suppression circuit element and an overcurrent detection element are provided in an overcurrent prevention circuit with which a prior art DC-DC converter is equipped, so that an input overcurrent is limited and thereby a power distribution unit is operated so as to prevent stopping due to overcurrent and the reliability of the power source is improved.

In accordance with an aspect of the present invention, there is provided a circuit for suppressing an input overcurrent of a power supply circuit including a plurality of DC-DC converters in which a parallel circuit, constituted by a resistor element and a switching element, is connected in series with an input circuit to interrupt the circuit in response to an overcurrent or overheating condition. A surge current-preventing circuit, when the power supply circuit is closed, prevents the surge current by turning the switching element off for a predetermined period of time. An AC-DC converter feeds a current to each of at least two or more DC-DC converters, among the plurality of DC-DC converters; a detector detects the input current to said DC-DC converters; and the switching element is turned off, to cause the fuse resistor element, that is connected in parallel with the switching element when the detector has detected an overcurrent, to conduct the overcurrent and rupture, thereby preventing the overcurrent from flowing in the AC-DC converter.

In accordance with another aspect of the present invention, there is provided a circuit for suppressing overcurrent in a power supply circuit including a plurality of DC-DC converters in which a parallel circuit, constituted by a resistor element and a switching element, is connected in series with an input circuit to break the input circuit in response to an overcurrent or overheating condition. A surge current-preventing circuit, when the power supply circuit is turned on, prevents a surge current by turning the switching element off for a predetermined period of time. An AC-DC converter feeds a current to each of at least two or more DC-DC converters, among the plurality of DC-DC converters; an inductor is connected in series between the parallel circuit constituted by the resistor element and the switching element, and a capacitor is further connected to the input side of a DC-DC converter unit; and a detector generates an output when a voltage across the terminals of a series circuit, comprised of the parallel circuit and the inductor, becomes greater than a predetermined value. The switching element is turned off by the output of the detector thereby to interrupt (i.e., cause an open circuit of) the resistor element that is connected in parallel with the switching element and thereby to suppress the overcurrent flowing in the AC-DC converter.

PREFERRED EMBODIMENTS OF THE INVENTION

Figure 1A:
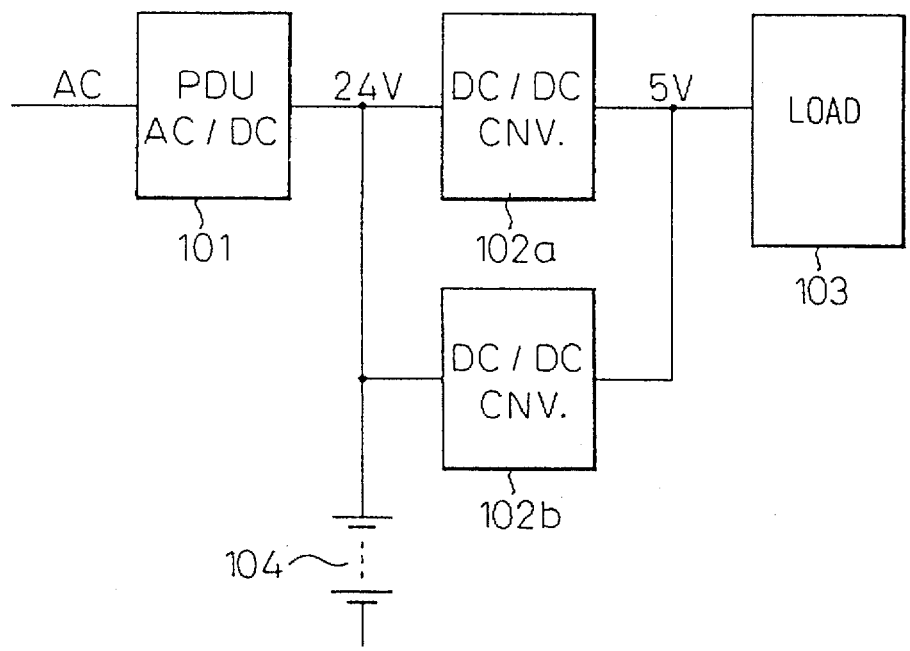
FIGS. 1(A) and 1(B) are diagrams illustrating the constitution of a power source device which is a prerequisite of the present invention.

FIGS. 1 (A) and 1 (B) are views showing the structure of a general power supply unit.

Reference numerals 101, 101a and 101b are power distribution units for converting alternating current into direct current (hereinafter, abbreviated as "PDU"); 102a and 102b are DC-DC converters for converting a low-voltage dc to higher-voltage dc or vice versa; 103, 103a and 103b are loads; and 104 is a battery for backup use.

In FIG. 1 (A), an alternating voltage AC is converted into, for example, twenty-four volts dc in a power distribution unit (PDU) 101 to be delivered to DC-DC converters ("DC-DC CNV's") 102a, 102b, which convert the 24V dc from the PDU 101 into, for example, 5 V dc to be delivered to a load 103.

In the above-mentioned power supply circuit, when, for example, the PDU 101 becomes defective, the DC voltage of 24 V is applied to the DC-DC converters 102a and 102b from the battery 104, and the DC voltage of 5 V is applied to the load 103 from the DC-DC converters 102a and 102b. If either one of the DC-DC converters 102a and 102b becomes defective, the other DC-DC converter works to apply the DC voltage of 5 V to the load 103.

Figure 1B:
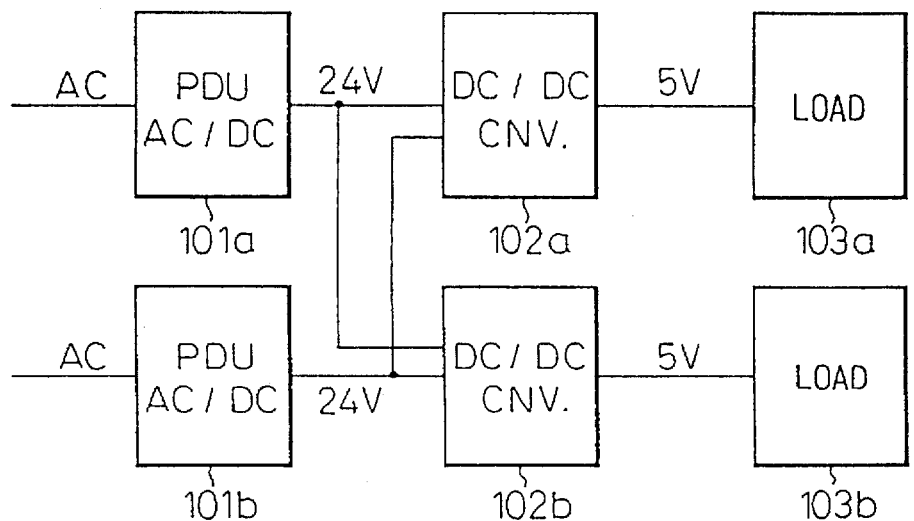

FIG. 1(B) illustrates the constitution in which the PDU that converts an AC voltage into a DC voltage of 24 V is fabricated in a duplexed manner, and the electric power is fed from each of the DC-DC converters 102a and 102b to the duplexed loads 103a and 103b.

In the above-mentioned power source circuit, when, for example, one of the PDUs 101a and 101b becomes defective, the electric power is fed to the DC-DC converters 102a and 102b from the other one of the PDU's and, 101a and 101b when one of the DC-DC converters 102a and 102b becomes defective, the other thereof is normally operated to supply power to the duplexed loads 103a and 103b.

Figure 2:
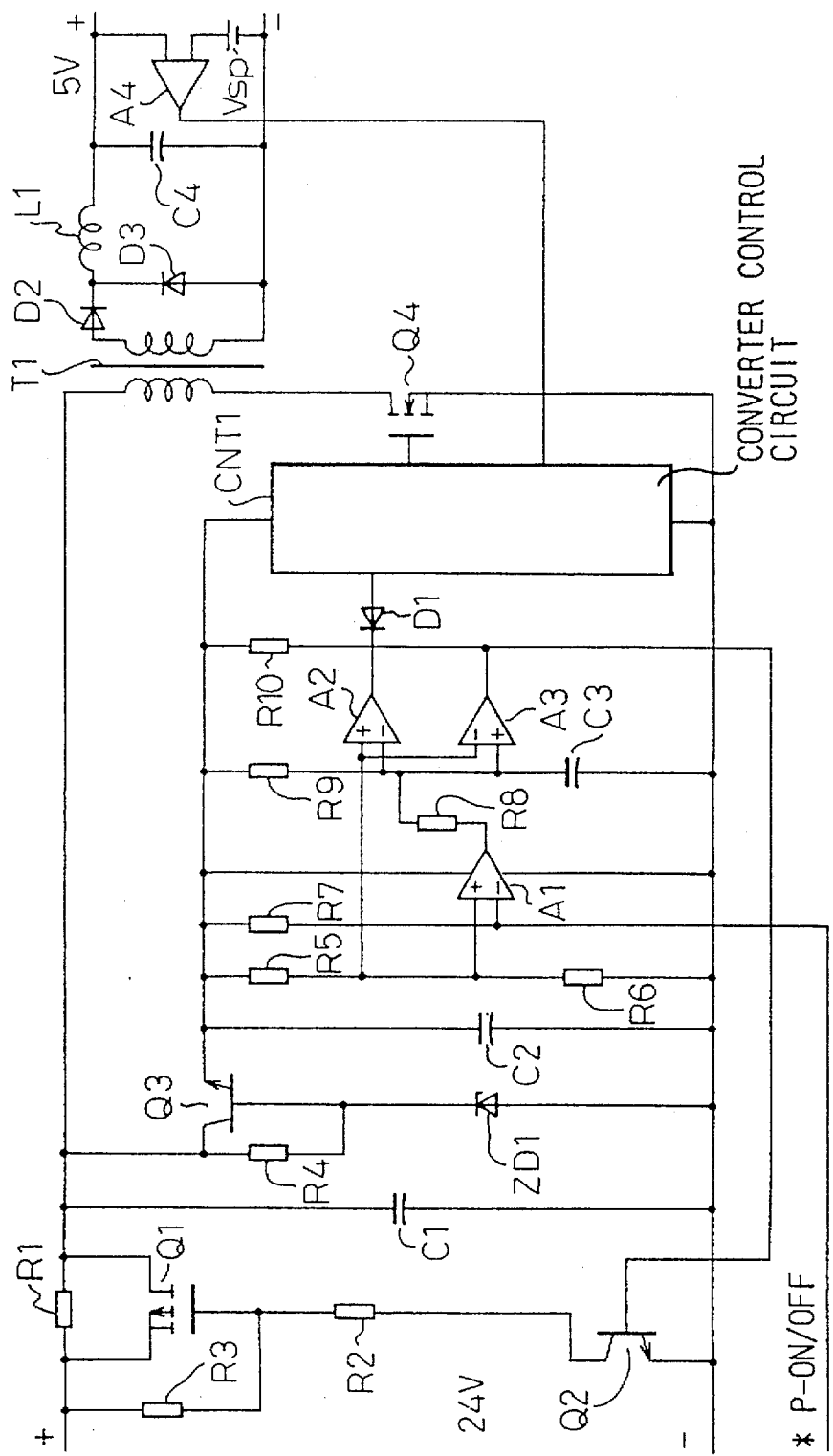
FIG. 2 is a diagram illustrating a prior art circuit.

FIG. 2 is a diagram illustrating a prior art DC-DC converter in the above-mentioned power source circuit wherein R1 denotes, for example, a fuse resistor which opens (i.e., produces an open circuit) when subjected to an overcurrent. The fuse resistor R1 is connected at a first terminal thereof to a plus (+) side terminal of the output of the PDU and at a second terminal thereof to a transformer T1 shown in FIG. 2, and a field-effect transistor Q1 is connected in parallel with the fuse resistor R1.

The gate of the field-effect transistor Q1 is connected to the plus (+) side terminal of the output of the PDU via a resistor R3 and is further connected to the collector of a transistor Q2 via a resistor R2. The emitter of the transistor Q2 is connected to a minus (−) side terminal of the output of the PDU and the base thereof is connected to the output of a comparator A3 that will be described later.

The circuit for preventing the surge current when the power source circuit is closed is constituted by a first circuit made up of comparators A1 to A3 and a capacitor C3 that will be described later, and a second circuit made up of the above-mentioned field-effect transistor Q1, the transistor Q2 and the fuse resistor R1.

Symbol C1 denotes a smoothing capacitor which is connected between the second terminal of the fuse resistor R1 and the minus (−) side terminal of the output of PDU.

Symbol Q3 denotes a transistor, ZD1 a Zener diode, R4 a resistor and C2 a capacitor. The collector of the transistor Q3 is connected to the second terminal of the fuse resistor R1, and the base of the transistor Q3 is connected to the anode terminal of the Zener diode ZD1. A resistor R4 is connected across the base and collector of the transistor Q3, and the smoothing capacitor C2 is connected between the emitter of the transistor Q3 and the (−) side output terminal of the PDU.

An auxiliary power source circuit, provided for a converter control circuit CNT1 which controls the DC-DC converter, is constituted by the transistor Q3, Zener diode ZD1, resistor R4 and capacitor C2.

Reference numerals R5, R6, R7, R8, R9 and R10 denote resistors, reference numerals A1, A2 and A3 denote comparators and C3 denotes the capacitor as above-noted, D1 denotes a diode and CNT1 denotes the converter control circuit, as above-noted. A connection point, or node, of the resistors R5 and R6 is connected to the (+) side input terminals of the comparators A1, A2 and to the (−) side input terminal of the comparator A3. The resistors R5 and R6 generate a reference voltage to be supplied to the comparators A1, A2 and A3.

The (−) side input terminal of the comparator A1 is connected to a *P-ON/OFF signal that assumes a low level when the power source circuit is closed, and to this connection point is connected a resistor R7 that is connected to the emitter of the transistor Q3.

The output of the comparator A1 is connected, via a resistor A8, to the (−) side input terminal of the comparator A2 and to the (+) side input terminal of the comparator A3. Moreover, the delay capacitor C3 is connected to the (−) side input terminal of the comparator A2, and a resistor R9 is connected in series with the capacitor C3.

A delay circuit, for preventing a surge current when the power source circuit is closed, is constituted by the capacitor C3 and the resistors R8 and R9.

The output of the comparator A2 is connected to the converter control circuit CNT1 via the diode D1, and the converter control circuit CNT1 starts operating when the output of the comparator A2 assumes the low level. Further, the output of the comparator A3 is connected to the emitter of the transistor Q3 via the resistor R10 and is connected to the base of the transistor Q2, which is turned on when the output of the comparator A3 assumes the high level.

The output of the converter control circuit CNT1 is connected to the main transistor Q4 which is driven by a pulse signal, such as a PWM (pulse width modulation) signal, output by the converter control circuit CNT1 and which thereby sends a pulse output to the primary side of the transistor T1.

To the secondary side of the transformer T1 are connected in series the rectifier diodes D2 and D3. A smoothing inductor L1 is connected to the connection point of the diodes D2 and D3 and, in addition, a smoothing capacitor C4 is connected to the output side of the inductor L1.

Furthermore, a comparator A4, connected to the output terminal of the DC-DC converter, compares the output voltage of the DC-DC converter with the reference voltage Vsp (5 V), and determines a deviation (i.e., difference) signal therebetween which it supplies as an output thereof to the converter control circuit CNT1.

In the DC-DC converter shown in FIG. 2, the transistor Q2 and the field-effect transistor Q1 are turned off when the power source circuit is turned on. When the power source circuit is turned on and the DC voltage of 24 V is applied to the input terminal of the DC-DC converter, the capacitor C1 is electrically charged via the fuse resistor R1.

Simultaneously with the closure of the power source circuit, furthermore, the *P-ON/OFF terminal assumes the low level and the comparator A1 outputs the high level. Therefore, the capacitor C3 begins to be electrically charged. When the voltage across the capacitor C3 rises up to the reference voltage determined by the resistors R5 and R6, after the passage of a predetermined period of time, the comparators A2 and A3 operate. As a result, the comparator A2 outputs the low level, the converter control circuit CNT1 starts operating, the comparator A3 outputs the high level, and the transistor Q2 is turned on.

When the transistor Q2 is turned on, the field-effect transistor Q1 is turned on, and a current that had been flowing from the power source via the fuse resistor R1 then flows via the field-effect transistor Q1.

The converter control circuit CNT1, which has started operating, generates a pulse signal of a predetermined duty cycle relying upon a deviation between the output voltage of the DC-DC converter output from the comparator A4 and the reference voltage Vsp, and turns the main transistor Q4 on/off to apply a pulse voltage to the primary side of the transformer T1. A pulse voltage generated on the secondary side of the transformer T1 is rectified through the diodes D2 and D3, and is smoothed through the inductor L1 and the capacitor C4, and whereby an output voltage of 5 V is generated at the output terminal of the DC-DC converter.

In the DC-DC converter shown in FIG. 2 and as described above, when the power source circuit is turned on, the field-effect transistor Q1 is turned on after the passage of a predetermined delay time, as determined by the capacitor C3 and the resistor R9. Therefore, the capacitor C1 can be electrically charged via the fuse resistor R1 during a period before the field-effect transistor Q1 is turned on, making it possible to prevent the surge current at the time when the power source circuit is closed.

In the conventional DC-DC converter shown in FIG. 2, when the capacitor C1 or the main transistor Q4 is short-circuited, an excessive current flows into the 24 -V line via the field-effect transistor Q1. Therefore, the voltage of the 24 -V line drops or an excessive current flows from the PDU shown in FIG. 1, and the output of the PDU is interrupted due to the excessive current, no electric power is fed to the load and the device ceases to operate.

According to the prior art as described above, even when the DC-DC converter is fabricated in a duplexed form, the PDU ceases to operate due to short-circuiting of the elements in the DC-DC converter, the supply of electric power to the load is interrupted and reliability of the power source is deteriorated.

Figure 3:
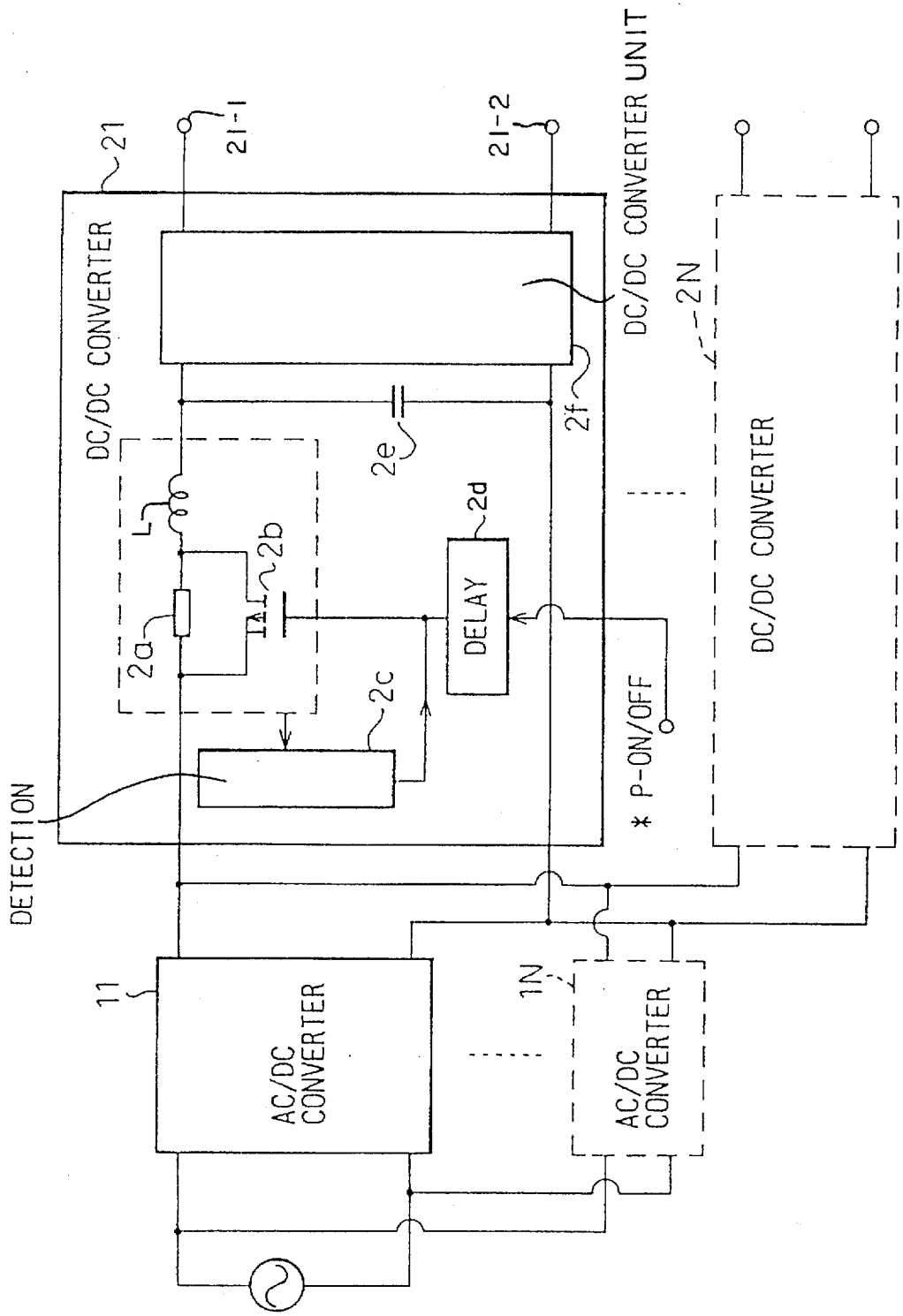
FIG. 3 is a block diagram illustrating the principle of the present invention.

FIG. 3 is a block diagram illustrating the principle of the present invention, wherein each reference numeral 1 (i.e., each of 11 to 1N) denotes an AC-DC converter, 2 (i.e., each of 21 to 2N) denotes a DC-DC converter, and, in the representative converter 21, 2a is a fuse resistor element (i.e., a current-limiting, fusible resistor) which will be cut off (i.e., open-circuited) in response to an overcurrent or over-heating condition, 2b is a switching element, 2c is an overcurrent detector, 2d is a delay element, 2e is a capacitor, and 2f is a DC-DC converter unit.

As described above, the present invention is concerned with a circuit for suppressing input overcurrent of a power source circuit comprising a plurality of DC-DC converters 21, . . . 2N in each of which a parallel circuit, constituted by a resistor element 2a and a switching element 2b, is connected in series with an input circuit to break (i.e., to open) the circuit in response to an overcurrent or overheating, and each thereof further has a surge current-preventing circuit which, when the power source circuit is closed, prevents a surge current from flowing by turning the switching element 2b off for a predetermined period of time and a plurality of AC-DC converters 11, . . . 1N, each thereof feeding a power current to at least two DC-DC converters of the plurality of DC-DC converters 21, . . . 2N.

The invention provides an improvement wherein a detector for detecting the input current is provided in each of the DC-DC converters 21, . . . 2N, and when a detector 2c of one thereof has detected an overcurrent, the associated switching element 2b is turned off to enable the resistor element 2a, that is connected in parallel with the associated switching element 2b, to suppress any overcurrent from flowing out of the AC-DC converter 1. Further, an inductor is connected in series with an input circuit of the DC-DC converter 2.

The invention further is concerned with a circuit for suppressing input overcurrent of a power source circuit comprising a plurality of DC-DC converters 21, . . . 2N in each of which a parallel circuit, constituted by a current-limiting, fusible resistor element 2a and a switching element 2b, is connected in series with an input circuit to break (i.e., to open) the circuit in response to an overcurrent or over-heating condition, and having a surge current-preventing circuit which, when the power source circuit is turned on, prevents a surge current from flowing by turning the switching element 2b off for a predetermined period of time; and a plurality of AC-DC converters 11, . . . 1N, each thereof feeding a current to two or more DC-DC converters of the plurality of DC-DC converters 21, . . . 2N.

The invention provides an improvement wherein an inductor is connected in series between the parallel circuit, constituted by the current-limiting resistor element 2a and the switching element 2b, and a capacitor 2e that is connected to the input side of a DC-DC converter unit 2f, and provision is made of a detector which generates an output when a voltage across the terminals of a series circuit, of the parallel circuit and the inductor L becomes greater than a predetermined value; and the switching element 2b is turned off by the output of the detector 2c thereby to enable the fusible resistor element 2a, that is connected in parallel with said switching element 2b, to suppress any overcurrent from flowing out of the AC-DC converter 1.

In FIG. 3, when the power source circuit is closed, the switching element 2b is turned off for a predetermined period of time due to the delay element 2d, and a current flowing from the AC-DC converter 11 into the representative DC-DC converter 21 further flows into the capacitor 2e through the resistor element 2a thereby to electrically charge the capacitor 2e.

When a predetermined period of time passes, the switching element 2b is turned on, and a current flows from the AD-DC converter 11 into the representative DC-DC converter 21 through the switching element 2b. The DC-DC converter unit 2f starts operating, and the output of the AC-DC converter 11 is converted, through the DC-DC converter 21, and is fed to a load connected to the output terminals 21-1 and 21-2.

When a short-circuit current flows into the input circuit of the DC-DC converter 21, due to short-circuiting of the capacitor 2e or the like provided on the input side of the DC-DC converter unit 2f, the detector 2c generates an output so that the switching element 2b is turned off. Therefore, the short-circuit current flowing into the DC-DC converter 21 flows through the resistor element 2a; i.e., the resistor element 2a becomes an open circuit and suppresses any overcurrent flowing in the AC-DC converter 1.

In accordance with the invention when an input overcurrent flows into the representative DC-DC converter 21, as described above, the switching element 2b thereof is turned off thereby to cause the overcurrent to be conducted by, and thereby produce an open circuit of, the associated, fusible resistor element 2a that is connected in parallel with the switching element 2b to suppress the overcurrent. Therefore, the circuit can be readily broken when an overcurrent flows due to internal short-circuiting in any one of the DC-DC converters 21, . . . 2N, and the involved AC-DC converter 11, . . . 1N is prevented from coming to a halt and the power can be continuously fed to the load. When an overcurrent is detected, furthermore, the switching element 2b of the surge current-preventing circuit is turned off to enable the resistor element 2a to conduct and become an open circuit, suppressing the overcurrent—i.e., there is no need to add any special switching element for interrupting the overcurrent, and the constitution of the device can be simplified.

The invention in another embodiment further employs an inductor connected in series with the input of the DC-DC converter 2 by which the same effects as those of the above embodiment of invention are obtained, and an instantaneous overcurrent, due to a delay in the operation of the switching element 2b, can be suppressed.

According to a further embodiment the invention, an inductance is connected in series between the parallel circuit, constituted by said resistor element (2a) and said switching element (2b), and a capacitor (2e) that is connected to the input side of a DC-DC converter unit (2f), and provision is made of a detector which generates an output when a voltage across the terminals of a series circuit, of the parallel circuit and the inductance, becomes greater than a predetermined value, and the switching element (2b) is turned off by the output of the detector (2c). Therefore, the same effects as those of the afore-mentioned embodiments of the invention are obtained, and an overcurrent of the DC-DC converter 2 can be sensitively and reliably detected.

Several specific embodiments of the invention are now described with reference to the drawings.

Figure 4:
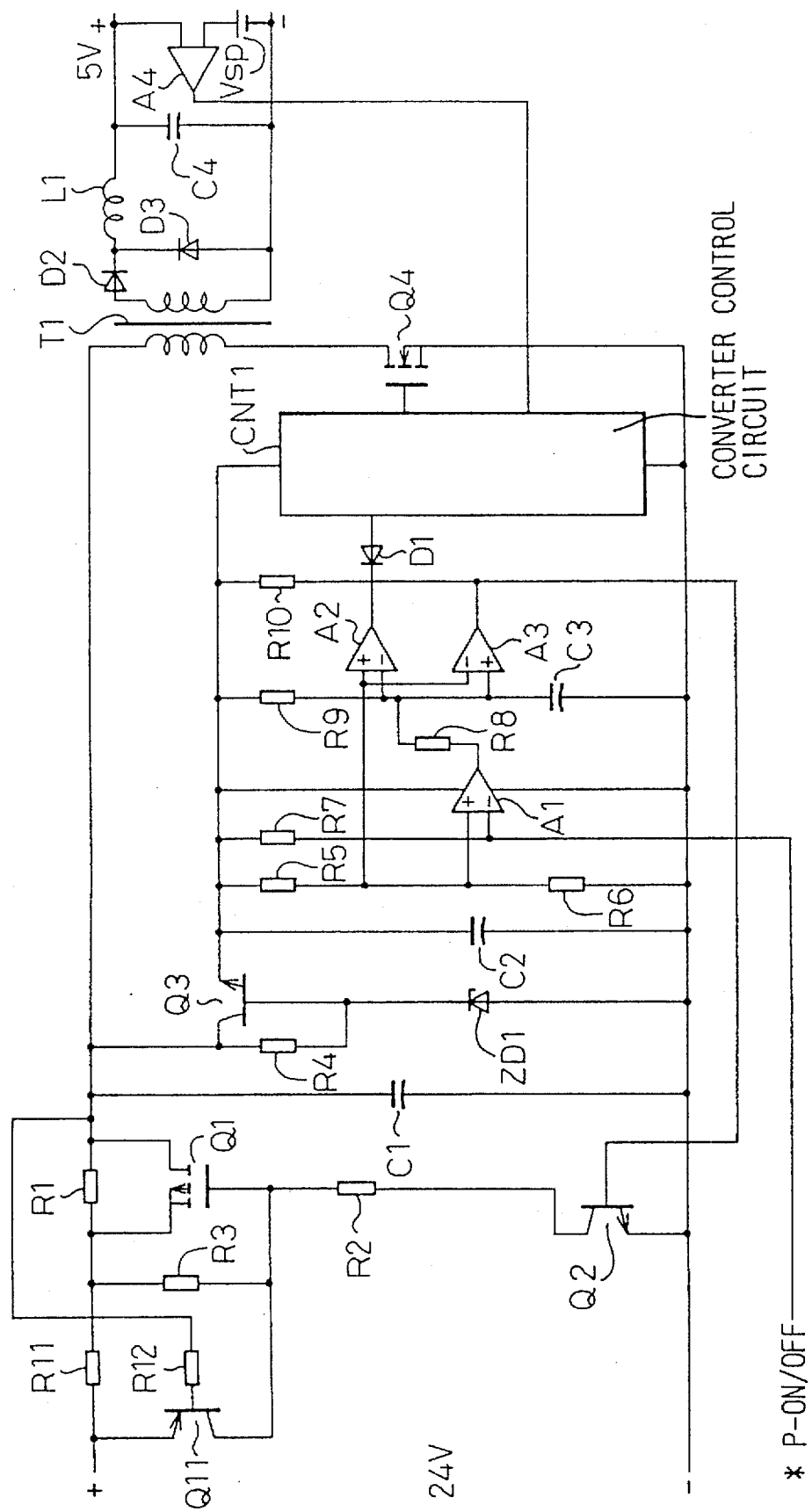
FIG. 4 is a diagram illustrating a first embodiment of the present invention.

FIG. 4 is a diagram illustrating a first embodiment of the present invention, wherein the same portions as those shown in FIG. 2 are denoted by the same reference numerals. In this embodiment, a resistor R11 is connected in series with the resistor R1 that is shown in FIG. 2, and the base and emitter of a transistor Q11 are connected via a resistor R12 to respective, opposite ends of a series circuit of the resistors R11 and R1, and the collector of the transistor Q11 is connected to the gate of the field-effect transistor Q1. In other respects, the constitution is the same as that of FIG. 2.

In FIG. 4, the operation, when the power source (i.e., supply) circuit is connected, is the same as that of the prior art shown in FIG. 2. When the power source circuit is connected, the field-effect transistor Q1, the transistor Q2 and the transistor Q11 are turned off. Since the power source circuit is connected and a DC voltage of 24 V is applied to the input terminals of the DC-DC converter, the capacitor C1 is electrically charged via the resistor R11 and the fuse resistor R1.

Simultaneously with the closure of the power source circuit, on the other hand, the *P-ON-OFF terminal assumes the low level and the comparator A1 outputs the high level. After the passage of a predetermined period of time, determined by the capacitor C3 and the resistor R9, the comparator A3 operates whereby the transistor Q2 and the field-effect transistor Q1 are turned on, and the current that had been flowing through the fuse resistor R1 flows through the field-effect transistor Q1. Furthermore, the comparator A2 operates, the converter control circuit CNT1 starts operating, and the DC-DC converter outputs a DC voltage of 5 V from the output terminals thereof.

Here, when a short-circuit current flows into the input of the DC-DC converter due to short-circuiting of the capacitor C1 in the DC-DC converter or due to short-circuiting of the main transistor Q4, the voltage rises across the ends of the series circuit consisting of the resistor R11 and the on-resistance of the transistor Q1. Therefore, the transistor Q11 is turned on, a voltage is applied to the gate of the field-effect transistor Q1 from the power source through the emitter and collector of the transistor Q11, and the field-effect transistor Q1 is turned off.

Therefore, the short-circuit current flows through the fuse resistor R1 and the fuse resistor R1 is opened (i.e., is ruptured, or blown, and thus becomes open-circuited), thereby to suppress the overcurrent of the PDU that is supplying a DC voltage of 24 V to the DC-DC converter.

Here, since the base of the transistor Q11 is connected to the source of the field-effect transistor Q1 through the resistor R12, the base current of the transistor Q11 flows through the resistor R12 and an element, such as the capacitor C1 that is short-circuited in the DC-DC converter, and the transistor Q11 is maintained turned on.

According to this first embodiment as described above, when a short-circuit current flows due to short-circuiting of the capacitor C1 in the DC-DC converter or short-circuiting of the main transistor Q4, the transistor Q1 in the surge current-preventing circuit is turned off thereby to cause the fuse resistor R1 that is connected in parallel with the transistor Q1 to conduct the overcurrent level power current and be ruptured, producing an open current condition. Therefore, the PDU that feeds electric power to the DC-DC converter is not stopped by the overcurrent and, thus, the reliability of the power source circuit can be improved.

Figure 5:
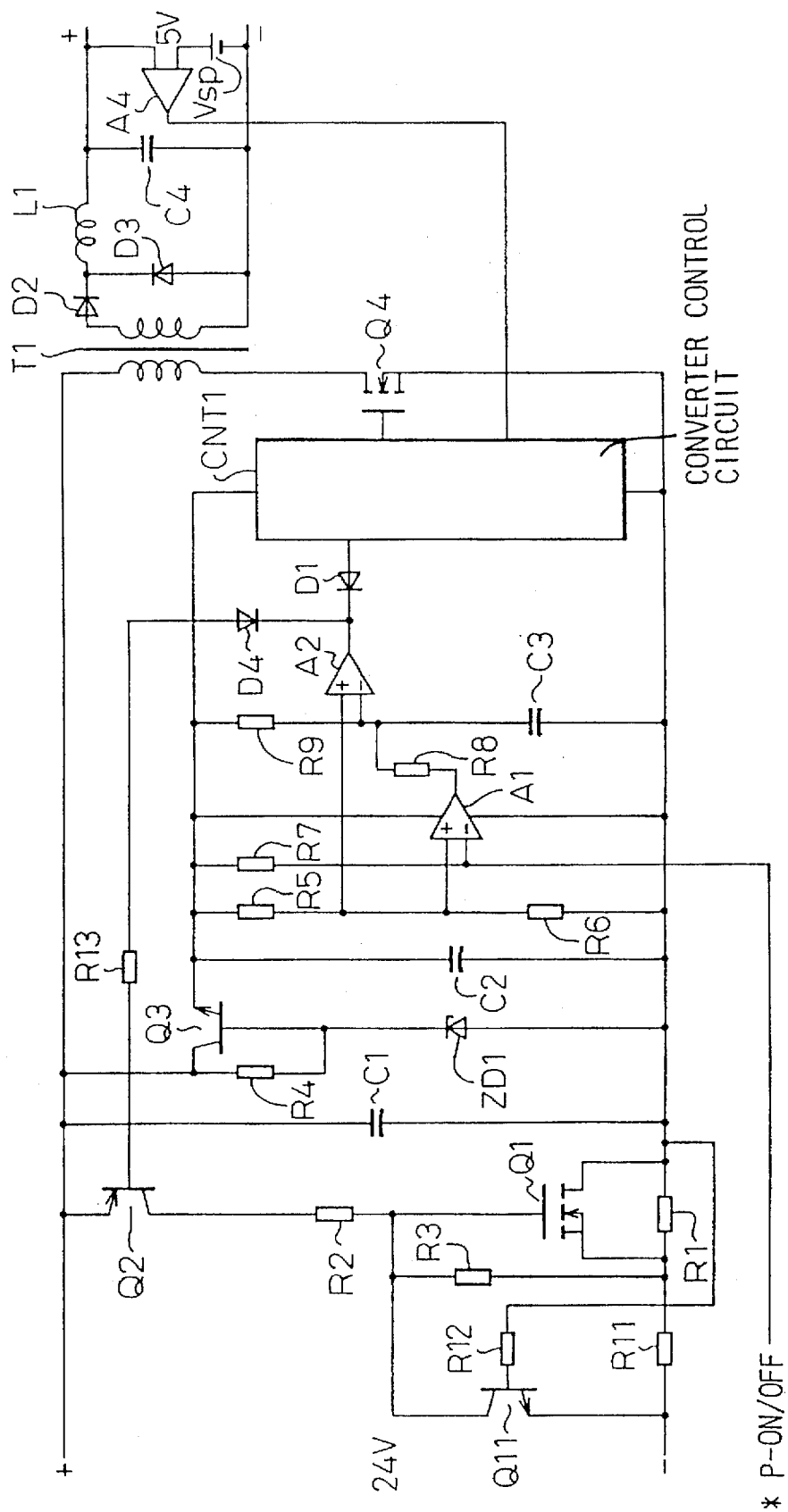
FIG. 5 is a diagram illustrating a second embodiment of the present invention.

FIG. 5 is a diagram illustrating a second embodiment of the present invention. According to this embodiment, the surge current-preventing circuit, consisting of the field-effect transistor Q1 and the like, and the circuit consisting of the resistors R11, R12 and the transistor Q11 are provided on the negative side of the DC-DC converter of the first embodiment, and the base of the transistor Q2 is connected to the output of the comparator A2 via a resistor R13 and a diode D4.

The operation of this embodiment of the invention is the same as that of the first embodiment of FIG. 4, and the same effects as those mentioned above are obtained. According to this embodiment, the transistor Q2 can be driven by the output of the comparator A2, and the comparator A3 can be omitted.

Figure 6:
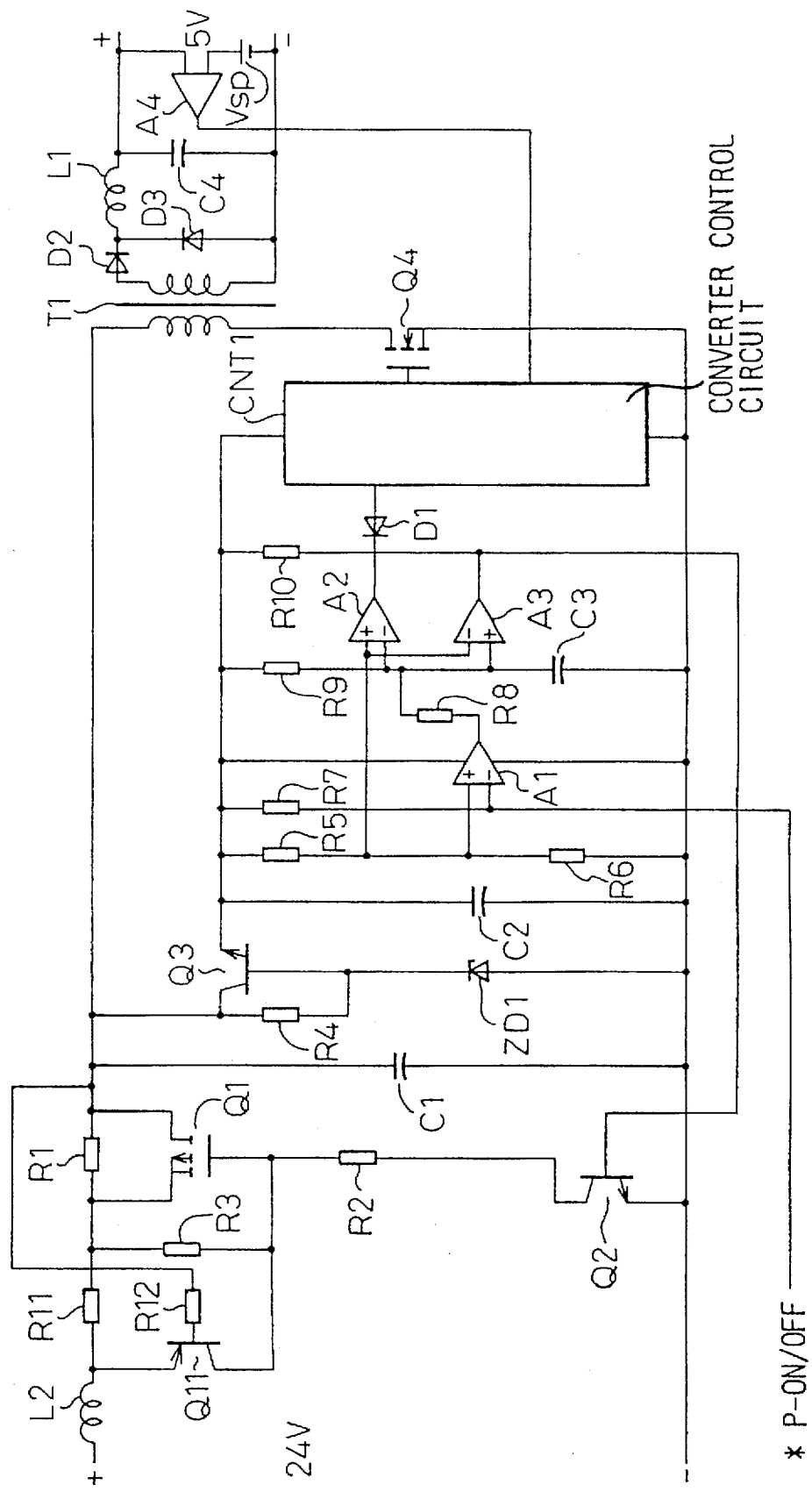
FIG. 6 is a diagram illustrating a third embodiment of the present invention.

FIG. 6 is a diagram illustrating a third embodiment of the present invention and wherein an inductor L2 is connected in series with the power source circuit of the embodiment of FIG. 4. This embodiment makes it possible to obtain the same effects as those of the embodiment of FIG. 4. With the inductor L2 being connected in series with the power source circuit, furthermore, it is made possible to prevent an excess current from flowing into the input circuit of the DC-DC converter during a delay time during which the field-effect transistor Q1 is turned off, when an element in the DC-DC converter is short-circuited.

That is, when an internal element such as the capacitor C1 in the DC-DC converter is short-circuited, the overcurrent is detected, relying upon the resistor R11 and the on-resistance of the field-effect transistor Q1, in order to turn the transistor Q11 on and the field-effect transistor Q1 off. However, there is a delay time before the field-effect transistor Q1 is turned off. When there is no inductance L2, therefore, an excess current flows during the above delay time.

In this third embodiment in which the inductance L2 is provided in series with the power source circuit, the excess current is suppressed by the inductor L2 and the PDU is prevented from being stopped by the excess current that flows during the delay time.

In the above-mentioned embodiment, though the inductor L2 is provided at the (+) side input terminal of the DC-DC converter, it may be provided at any position between the capacitor 1 and the input terminal on the (+) side or the (−side) of the DC-DC converter.

Figure 7:
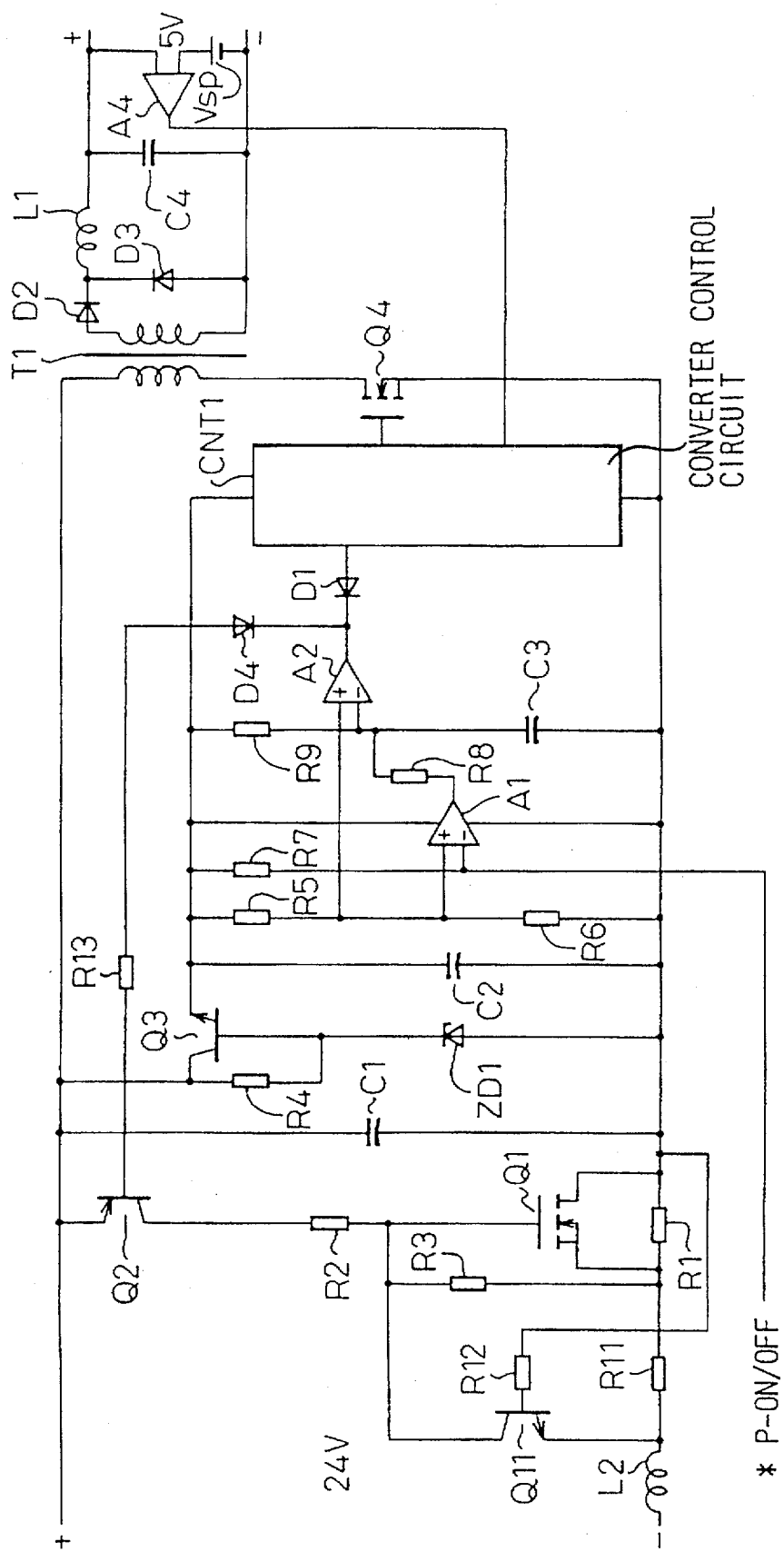
FIG. 7 is a diagram illustrating a fourth embodiment of the present invention.

FIG. 7 is a diagram illustrating a fourth embodiment of the present invention. In this embodiment, the surge current-preventing circuit consisting of the field-effect transistor Q1 and the like, the circuit consisting of the resistors R11, R12 and the transistor Q11, and the inductance L2 are provided on the negative side of the DC-DC converter of the third embodiment, and the base of the transistor Q2 is connected to the output of the comparator A2 via the resistor R13 and the diode D4.

The operation of this fourth embodiment of the invention is the same as that of the embodiment of FIG. 6, and the same effects as those described above are obtained. In this embodiment like in the second embodiment, the transistor Q2 can be driven by the output of the comparator A2, and the comparator A3 can be omitted.

Figure 8:
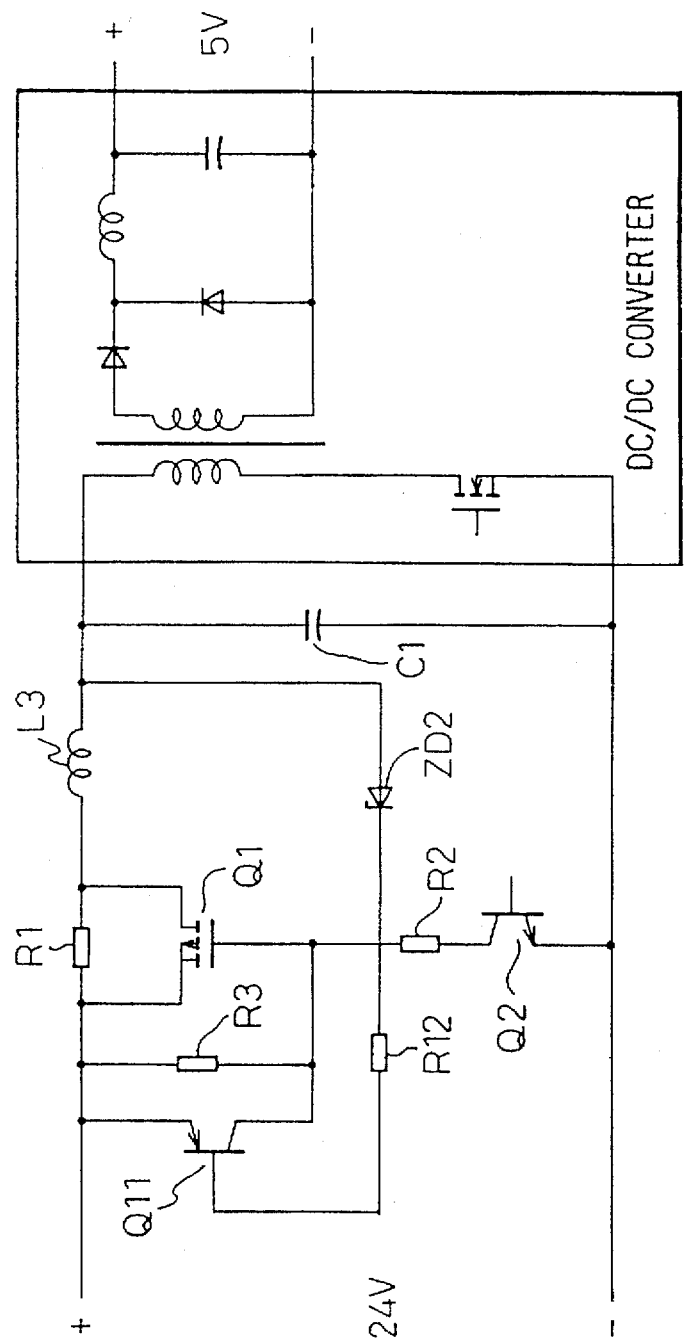
FIG. 8 is a diagram illustrating a fifth embodiment of the present invention.

FIG. 8 is a diagram illustrating a fifth embodiment of the present invention. FIG. 8 illustrates only the surge current-preventing circuit and the circuit for suppressing the input overcurrent of this embodiment in the DC-DC converter of FIG. 4, but does not illustrate other portions.

In this fifth embodiment, an inductor L3 is connected between the fuse resistor R1 and the capacitor C1, the emitter of the transistor Q11, which detects the input overcurrent of the DC-DC converter, is connected to a first terminal of the fuse resistor R1, on the input side of the DC-DC converter, and the base of the transistor Q11 is connected to a connection point of the inductance L3 and the capacitor C1 through the resistor R12 and the Zener diode ZD2. In other respects, the constitution is the same as that of the first embodiment shown in FIG. 4.

In FIG. 8, when an internal element such as the capacitor C1 in the DC-DC converter is short-circuited, the short-circuit current that flows into the input circuit of the DC-DC converter is suppressed by the inductance L3, and a voltage that corresponds to the input voltage of 24 V of the DC-DC converter is applied to both ends of the inductance L3. Therefore, the Zener diode ZD2 having a Zener voltage lower than the input voltage to the DC-DC converter is made to conduct, and the transistor Q11 is turned on. As a result, the field-effect transistor Q1 is turned off, and the short-circuit current due to the short-circuiting of the internal element of the DC-DC converter flows into the fuse resistor R1 which then cuts off (i.e., suppresses) the short-circuit current.

According to this fifth embodiment in which the inductor L3 is connected between the fuse resistor R1 and the capacitor C1 as described above, the short-circuit current is suppressed by the inductance L3 when the internal element of the DC-DC converter is short-circuited, and a voltage that corresponds to the input voltage of the DC-DC converter is applied to the inductance L3. Therefore, short-circuiting of the element in the DC-DC converter is sensitively and reliably detected, and the overcurrent due to the short-circuiting is cut off.

Figure 9:
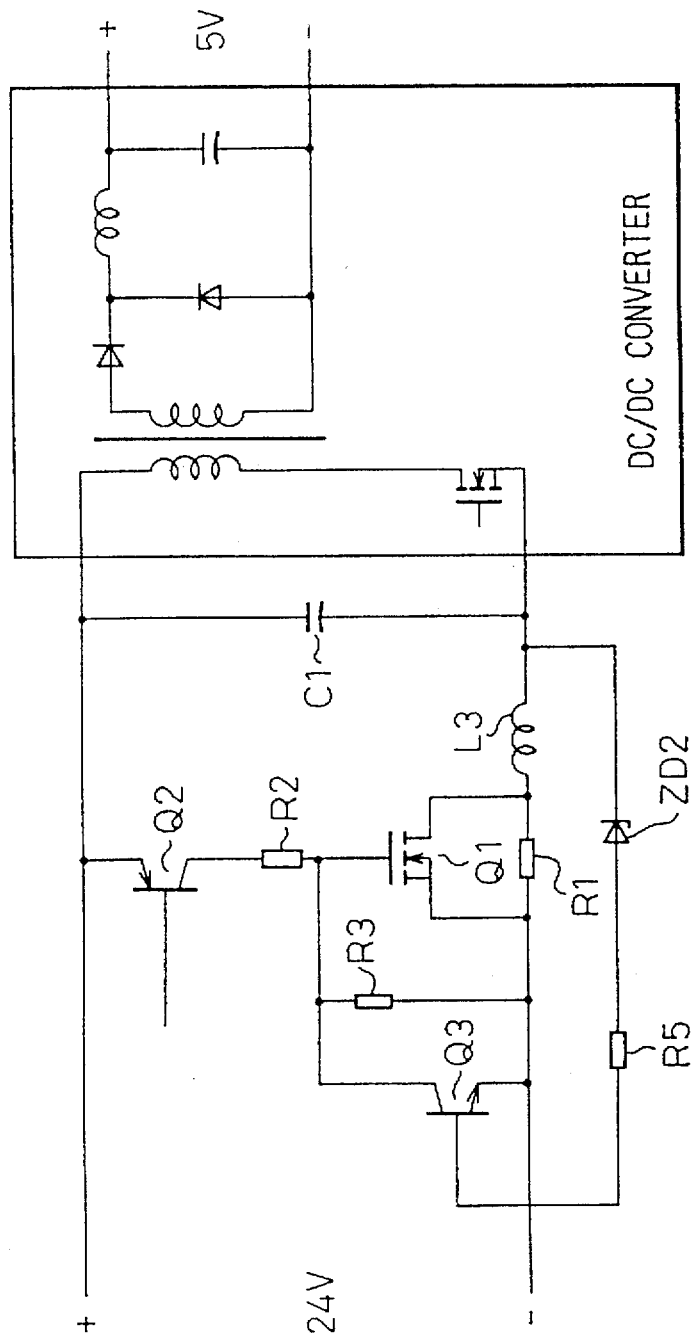
FIG. 9 is a diagram illustrating a sixth embodiment of the present invention.

FIG. 9 is a diagram illustrating a sixth embodiment of the present invention. In this embodiment, the surge current-preventing circuit, the input overcurrent-suppressing circuit and the inductance L3 are provided on the negative side of the DC-DC converter in the fifth embodiment shown in FIG. 8. The operation is the same as the aforementioned operation of the embodiment of FIG. 8, and the same effects as those described above are obtained.

Even in this embodiment, as in the embodiments of FIGS. 4 and 6, the transistor Q2 can be driven by the output of the comparator A2, and the comparator A3 can be omitted.

Though the aforementioned embodiments have employed the fuse resistor R1 as a resistor element that is connected in parallel with the switching element of the surge current-suppressing circuit, the resistor element according to the present invention is in no way limited to the above fuse resistor R1 but may be any one of a variety of other widely known elements, such as a resistor element that opens when overheated.

According to the present invention and as described above, the power source circuit comprises a plurality of DC-DC converters equipped with a surge current-preventing circuit, and an AC-DC converter for feeding electric power to two or more DC-DC converters, wherein the switching element of the surge current-preventing circuit is turned off when the input current to the DC-DC converter becomes excessive in order to enable current conduction through and cause an open circuit of the fuse resistor element that is connected in parallel with the switching element. Thus an overcurrent flowing from the AC-DC converter is suppressed and the circuit is readily broken when an overcurrent flows due to internal short-circuiting in any one of the DC-DC converters.

Even in the event of trouble such as internal short-circuiting of the DC-DC converter, therefore, the AC-DC converter does not come to a halt and the electric power is continuously fed to the load, enabling the reliability of the power source device to be improved. When the overcurrent is detected, furthermore, the switching element 2b of the surge current-preventing circuit is turned off to enable conduction through the resistor element 2a. Therefore, there is no need to add any special switching element for cutting the overcurrent off, and the constitution of the apparatus can be simplified.

With the inductance being connected in series with the input circuit of the DC-DC converter, furthermore, it is made possible to suppress an instantaneous overcurrent that is generated due to a delay in the switching element. By detecting the voltage across the inductance, furthermore, the overcurrent to the DC-DC converter can be sensitively and reliably detected.

I claim:

1. A DC power supply circuit, comprising:

a plurality of DC-DC converters;

an AC-DC converter feeding corresponding input power currents to at least two of the plurality of DC-DC converters; and each of the plurality of DC-DC converters comprising:

an input circuit of a fuse resistor and a switch connected in parallel, the switch normally being ON and shunting the resistor, a surge current preventing circuit, responsive to a connection of the DC-DC converter to the AC-DC converter initiating the feeding of an input power current from the AC-DC converter to the DC-DC converter, turning the switch OFF for a predetermined period of time during which the input power current is conducted through the fuse resistor, and which thereby suppresses any surge current level of the input power current, and turning the switching element ON at the conclusion of the predetermined period of time for conducting the input power current therethrough and bypassing the fuse resistor, and a detector detecting an over-current level of the input power current conducted through the ON switch of the input circuit and producing an over-current detection output turning the switch OFF, the fuse resistor conducting therethrough, and suppressing, the input power current of the over-current level and thereby preventing any supply thereof from the AC-DC converter to the DC-DC converter.

2. A circuit according to claim 1, wherein each DC-DC converter further comprises an inductor connected in series with the input circuit thereof and having a value of inductance which suppresses any surge current level of the input power current during an interval between the initiation of the feeding of the input power current to the DC-DC converter and the time at which the switch is turned OFF.

3. A DC power supply circuit as recited in claim 1, wherein the detector further comprises:

a detector resistor connected in a series connection with the input circuit;

a transistor switch having base and emitter terminals respectively connected across corresponding terminals of the series connection of the detector resistor and the input circuit and a collector terminal at which the overcurrent detection output is produced and supplied to the switch of the input circuit, the transistor switch responding to a voltage drop developed across the detector resistor when conducting an over-current level of the input power current for producing the over-current detection output.

4. A DC power supply circuit as recited in claim 3, further comprising an inductor connected in series with the input circuit thereof and having a value of inductance which suppresses any surge current level of the input power current during an interval between the initiating of the feeding of the input power current and the time at which the switch is turned OFF.

5. A DC power supply circuit as recited in claim 1, wherein:
the switch of the input circuit comprises a field effect transistor having source and drain terminals connected to respective opposite end terminals of the fuse resistor at corresponding, first and second parallel connection nodes; and
the input circuit further comprises a bias resistor having a first terminal connected to a base terminal of the field effect transistor and a second terminal connected to the drain terminal of the field effect transistor and thereby to the corresponding parallel connection node.

6. A DC power supply circuit as recited in claim 5, wherein the detector further comprises:
a detector resistor having a first terminal connected to the first parallel connection node, in series with the fuse resistor, and a second terminal; and
a transistor, having emitter and collector terminals connected to corresponding ones of the second terminal of the detector resistor and the gate terminal of the field effect transistor and having a base terminal connected to the second parallel connection node, rendered conductive in response to the voltage drop across the detector resistor, produced by the over-current level of the input power current, and supplying the input power current of the over-current level to the base of the field effect transistor.

7. A DC power supply circuit as recited in claim 6, wherein each DC-DC converter further comprises:
positive polarity and negative polarity power supply input lines respectively connected to positive polarity and negative polarity power supply output lines of each AC-DC converter connected thereto; and
the input circuit and the detector resistor are connected in series with the positive polarity power supply input line and the gate of the field effect transistor is connected through a further resistor and a further transistor to the negative polarity power supply input line.

8. A DC power supply circuit as recited in claim 7, wherein the surge prevention circuit, in response to a surge current level exceeding a reference current level, enables conduction of the further transistor and thereby turns ON the field effect transistor for the predetermined period of time.

9. A DC power supply circuit as recited in claim 6, wherein:
each DC-DC converter further comprises a negative power supply input line and a negative power supply input line respectively connected to positive and negative power supply output lines of each AC-DC converter connected thereto; and
the input circuit and the detector resistor are connected in series in the negative polarity power supply input line and the gate of the field effect transistor is connected through a further resistor and further transistor to the positive polarity power supply input line.

10. A DC power supply circuit as recited in claim 9, wherein the surge prevention circuit, in response to a surge current level exceeding a reference current level, enables conduction of the further transistor and thereby turns ON the field effect transistor for the predetermined period of time.

11. A DC power supply system comprising plural DC power supplies, plural DC-DC converters and plural loads, each DC power supply being connected to at least two associated DC-DC converters, of the plural DC-DC converters, for supplying respective input power currents thereto and each load being connected to at least an associated DC-DC converter, of the plural DC-DC converters, each DC-DC converter comprising:
an input circuit connected in series circuit relationship between the DC-DC converter and the associated DC power supply supplying an input power current thereto and conducting therethrough the input power current supplied by the associated DC power supply, the input circuit comprising a parallel connection of a fusible resistor and a switch, the switch normally being in an ON condition and shunting the false resistor;
a power-on detector detecting the initiation of supply of an input power current thereto from the associated DC power supply and producing a corresponding power-on detection output;
a delay circuit receiving the power on detection output and, in response thereto and for a selected time thereafter, producing a first control output, the switch being turned OFF in response to the power-on detection output and the input power current being conducted by the fusible resistor of the input circuit and the fusible resistor suppressing any surge current level of the input power current for the selected time; and
an over-current detector detecting an over-current level of the input power current and, in response thereto, producing an over-current detection output which is supplied to the switch and turns the switch OFF, causing the input power current of the over-current level to be conducted by and rupture the fusible resistor and thereby preventing any continuing flow of the input power supply current of the over-current level into the DC-DC converter.

12. A power supply system as recited in claim 11, wherein each load is connected only to a respectively associated, single DC-DC converter and each DC-DC converter is connected to at least two associated DC power supplies.

13. A power supply system as recited in claim 12, wherein each of the plural DC power supplies comprises an AC-DC converter.

14. A power supply system as recited in claim 13, wherein the plural DC-DC converters are connected in common to a power supply battery and to a common AC-DC converter.

15. A power supply system as recited in claim 12, wherein each of first and second DC-DC converters, of the plural DC-DC converters, is connected to both of first and second DC-DC converters, of the plural AC-DC converters.

16. A power supply system as recited in claim 11, wherein one of the plural DC power supplies comprises a battery.

17. A power supply system as recited in claim 11, wherein the over-current detector is responsive to the level of the input power current flowing through the switch exceeding an acceptable current level for producing the over-current detection output.

18. A power supply system as recited in claim 11, wherein the over-current detector comprises a further resistor connected in series with the input circuit, the over-current detector detecting the over-current level of the input power current when flowing through the further resistor and the switch in the ON condition thereof.

19. A power supply system as recited in claim 18, wherein:

the switch comprises a field effect transistor having source and gate terminals connected to respective, opposite terminals of the fusible resistor; and the over-current detector further comprises a further transistor having emitter and collector terminals respectively connected to an input terminal of the DC-DC converter, receiving the input power current supplied thereto from the associated DC power supply, and to the base of the field effect transistor, and a base terminal connected to the source terminal of the field effect transistor.

20. A power supply system as recited in claim 19, further comprising an inductor connected in series with the input circuit and having a value of inductance which suppresses any surge current level of the input power current during a time interval between the initiation of the supply thereof and the time at which the switch is turned OFF.

21. A power supply system as recited in claim 20, wherein the inductor is connected between an input terminal of the parallel circuit and the associated AC-DC converter.

22. A power supply system as recited in claim 20, wherein the inductor is connected in series with the input circuit and an output terminal of the input circuit.

* * * * *

UNITED STATES PATENT AND TRADEMARK OFFICE
CERTIFICATE OF CORRECTION

PATENT NO.   : 5,726,849
DATED        : Mar. 10, 1998
INVENTOR(S)  : NAKAMURA

It is certified that error appears in the above-identified patent and that said Letters Patent is hereby corrected as shown below:

Col. 1,   line 7, change "1995" to --1994--.

Col. 12,  line 30 (claim 11, line 16), change "false" to --fuse--.

Signed and Sealed this

Thirtieth Day of June, 1998

Attest:

BRUCE LEHMAN

Attesting Officer        Commissioner of Patents and Trademarks